United States Patent
Gerstenberger et al.

(10) Patent No.: US 8,155,065 B2
(45) Date of Patent: Apr. 10, 2012

(54) METHOD AND ARRANGEMENT IN A TELECOMMUNICATION SYSTEM

(75) Inventors: Dirk Gerstenberger, Stockholm (SE); Hakan Olofsson, Stockholm (SE); Johan Bergman, Kista (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 854 days.

(21) Appl. No.: 12/279,149

(22) PCT Filed: Feb. 9, 2007

(86) PCT No.: PCT/SE2007/050084
§ 371 (c)(1),
(2), (4) Date: Aug. 12, 2008

(87) PCT Pub. No.: WO2007/094733
PCT Pub. Date: Aug. 23, 2007

(65) Prior Publication Data
US 2009/0003305 A1    Jan. 1, 2009

(30) Foreign Application Priority Data
Feb. 13, 2006  (SE) ...................... 0600374

(51) Int. Cl.
*H04Q 7/00* (2006.01)
*H04L 12/28* (2006.01)
(52) U.S. Cl. ....................... 370/329; 370/412
(58) Field of Classification Search ............ None
See application file for complete search history.

(56) References Cited

U.S. PATENT DOCUMENTS

| | | | |
|---|---|---|---|
| 5,586,120 A * | 12/1996 | Cadd | 370/468 |
| 6,393,007 B1 * | 5/2002 | Haartsen | 370/337 |
| 7,593,407 B2 * | 9/2009 | Chun et al. | 370/394 |
| 7,689,178 B2 * | 3/2010 | Parkvall et al. | 455/114.2 |
| 2001/0004375 A1 * | 6/2001 | Partyka | 375/135 |
| 2002/0141367 A1 * | 10/2002 | Hwang et al. | 370/335 |
| 2003/0072285 A1 * | 4/2003 | Onggosanusi et al. | 370/335 |
| 2003/0174780 A1 * | 9/2003 | Heikkila | 375/259 |
| 2004/0085934 A1 * | 5/2004 | Balachandran et al. | 370/335 |
| 2004/0192204 A1 * | 9/2004 | Periyalwar et al. | 455/25 |
| 2005/0047366 A1 | 3/2005 | Ghost et al. | |

(Continued)

OTHER PUBLICATIONS

3G TR 25.xxx V0.0.0 (Sep. 2009) *Technical Report*: 3rd Generation Partnership Project; Technical Specification Group Radio Access Network; Terminal Power Saving Features; (Release 2000) 13 pages. 3GPP support office address: 650; Route des Lucioles, Sophia-Antipolis, Valbonne, France.

(Continued)

*Primary Examiner* — Hassan Phillips
*Assistant Examiner* — Eunsook Choi
(74) *Attorney, Agent, or Firm* — Myers Bigel Sibley & Sajovec, P.A.

(57) ABSTRACT

The present invention relates to methods and arrangements for interference reduction for bursty or intermitted transmissions. DPCCH gating with regular on/off-gating patterns can create waveforms that can interfere with non-UMTS audio equipments, e.g. hearing aids. The present invention relates to modifying the transmission instants of data packets in such a way such interference can be significantly reduced. This is achieved by introducing a randomization mechanism into the mapping function of data packets onto the HARQ processes, which in turn are mapped onto predefined transmission occasions (sub-frames). This results in a non-periodic transmission pattern while maintaining user data transmission requirements.

13 Claims, 8 Drawing Sheets

U.S. PATENT DOCUMENTS

| | | | | |
|---|---|---|---|---|
| 2006/0176867 A1* | 8/2006 | Kwak et al. | ............... | 370/342 |
| 2006/0195767 A1* | 8/2006 | Ihm et al. | ............... | 714/776 |
| 2006/0209783 A1* | 9/2006 | Jain et al. | ............... | 370/349 |
| 2006/0256757 A1 | 11/2006 | Kuusela et al. | | |
| 2007/0014272 A1* | 1/2007 | Palanki et al. | ............... | 370/344 |
| 2007/0030839 A1 | 2/2007 | Vimpari et al. | | |
| 2007/0153735 A1* | 7/2007 | Frederiksen et al. | ......... | 370/329 |
| 2008/0059859 A1* | 3/2008 | Marinier et al. | ............... | 714/748 |
| 2008/0123595 A1* | 5/2008 | Lindheimer et al. | .......... | 370/331 |
| 2008/0254819 A1* | 10/2008 | Niwano et al. | ............... | 455/522 |
| 2009/0022098 A1* | 1/2009 | Novak et al. | ............... | 370/329 |

OTHER PUBLICATIONS

Examination Report under Section 18(3) for Application No. GB0813335.7, May 18, 2010.

International Search Report dated Aug. 6, 2007 (4 pages).

Written Opinion dated Aug. 6, 2007 (8 pages).

$3^{rd}$ Generation Partnership Project; "Technical Specification Group Radio Access Network; Continuous Connectivity for Packet Data Users"; Release 7; 3GPP TR 25.903, V0.2.0; Nov. 2005; p. 15-17; (36 pages).

$3^{rd}$ Generation Partnership Poject; 3GPP TSG-RAN WG2 Meeting #48bis; Cannes, France; Oct. 10-14, 2005; p. 2; (2 pages).

* cited by examiner

METHOD AND ARRANGEMENT IN A TELECOMMUNICATION SYSTEM

FIELD OF THE INVENTION

The present invention relates to methods and arrangements in cellular mobile communication systems, in particular to methods and arrangements for interference reduction for bursty or intermitted transmissions.

BACKGROUND OF THE INVENTION

Packet-oriented features like High-Speed Downlink Packet Access (HSDPA) and Enhanced Uplink (E-DCH) in Universal Mobile Telecommunication Network Systems (UMTS) with radio access networks applying code-division multiple access schemes will promote the subscribers, desire for continuous connectivity, which implies that users stay connected over a long time period, however, with only occasional active periods of data transmission, and avoiding frequent connection terminations and re-establishments with the inherent overhead and delays. This is the perceived mode that a subscriber is used to in fixed broadband networks (like, e.g., DSL) and a precondition to attract users from such fixed broadband networks.

In order to support a high number of HSDPA-users in the code limited downlink, a fractional downlink physical channel (F-DPCH) has been introduced Release 6 of the specifications for UMTS issued by the $3^{rd}$ Generation Partnership Project (3GPP). On the other hand, for the uplink, it has been observed that the limiting factor for supporting a similarly high number of E-DCH users is the noise rise. If it can be assumed that many users during at least certain time periods are not transmitting any user data (e.g. when reading during a web browsing session or in between packets for periodic packet transmissions such as VoIP), the corresponding overhead in the noise rise caused by maintained control channels will significantly limit the number of users that can be efficiently supported.

As a complete release of dedicated channels during periods of traffic inactivity would cause considerable delays for re-establishing data transmission and a corresponding bad user perception, the impact of control channels on uplink noise rise is to be reduced while maintaining the connections and allowing a much faster reactivation for temporarily inactive users. This is considered to contribute to a significant increase of the number of packet data users (i.e. HS-DSCH/E-DCH users without UL DPDCH) in the UMTS FDD system that can stay in the CELL_DCH state over a long time period without degrading cell throughput and that can restart transmission after a period of inactivity with a much shorter delay (<50 ms) than would be necessary for re-establishment of a new connection.

Figure 1:
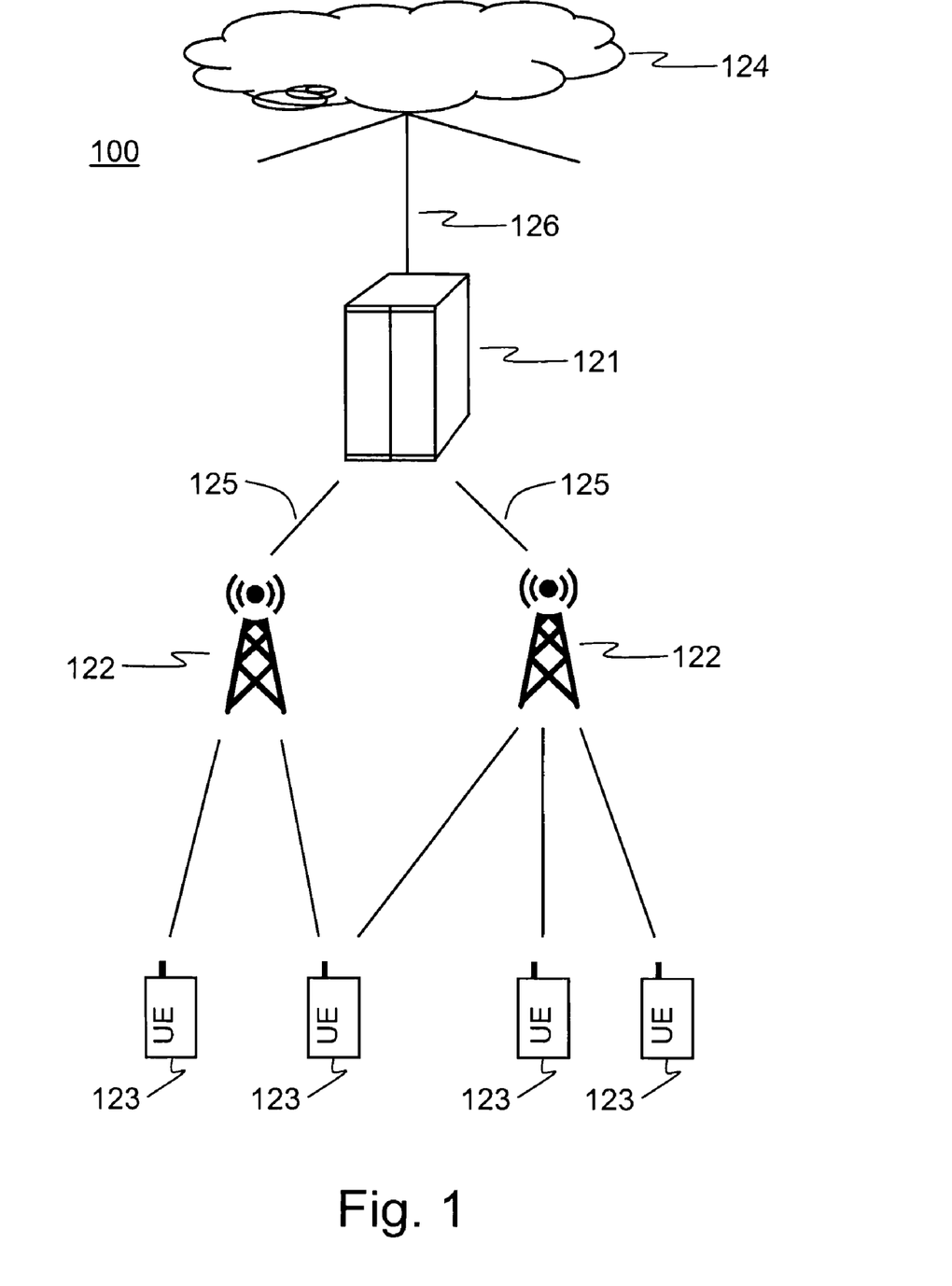
FIG. 1 illustrates an example of the architecture of a UMTS radio access network (UTRAN) architecture with HSDPA and Enhanced UL.
Figure 2:
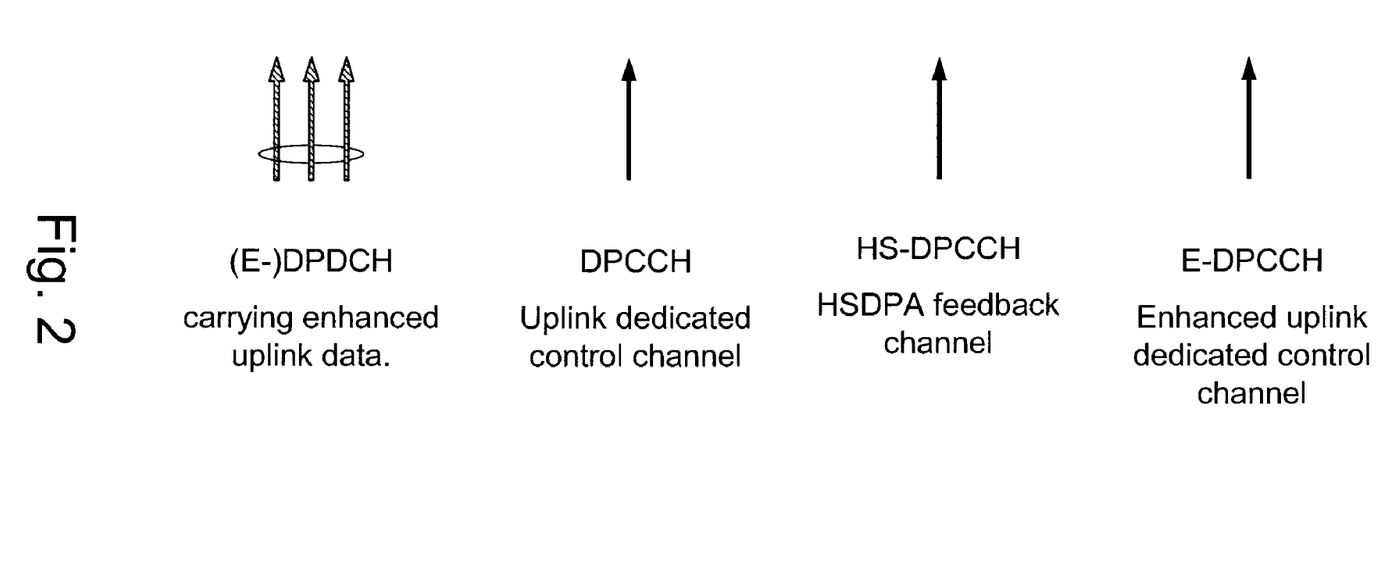
FIG. 2 illustrates the various uplink channels.

In the uplink direction, several channels from each user equipment will be transmitted with the introduction of the enhanced uplink as illustrated in FIG. 1. The DPCCH carries pilot symbols and parts of the outband control signaling. Remaining outband control signaling for the enhanced uplink is carried on the E-DPCCH, while the E-DPDCH carries the data transmitted using the enhanced uplink features. The HS-DPCCH carries positive and negative acknowledgements (ACK/NAK) related to the HSDPA downlink transmissions and Channel Quality Indicators (CQI) to inform the radio base station, e.g. the NodeB, about the downlink channel conditions experienced by a particular user equipment.

Figure 3A:
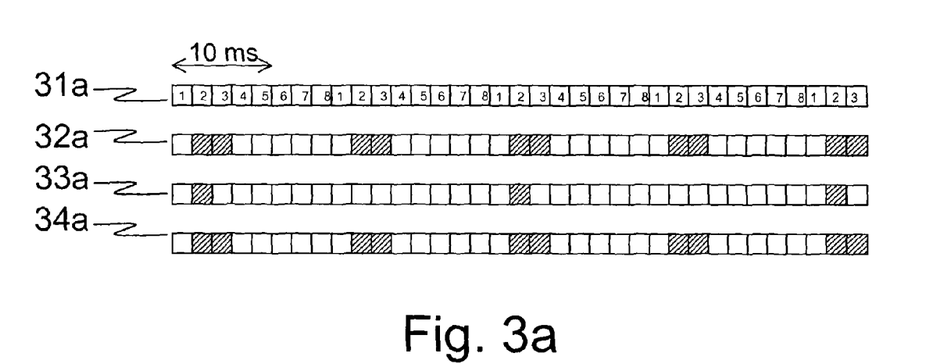
FIGS. 3a and 3b illustrate examples for DPCCH gating patterns.
Figure 3B:
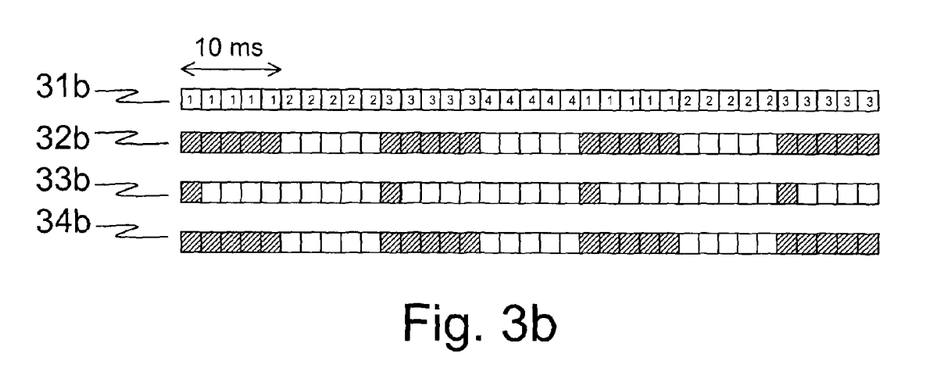

Similarly to the uplink in earlier releases of the WCDMA standard, the enhanced uplink uses inner and outer loop power control (OLPC). The power control mechanism ensures that a user equipment does not transmit with higher power than required for successful delivery of the transmitted data (possibly using multiple transmission attempts). This ensures stable system operation and efficient radio resource utilization. Further, uplink DPCCH gating described in 3GPP TR 25.903, "Continuous Connectivity for Packet Data Users", is considered to be an enhancement of E-DCH and HSDPA and a further means to reduce the uplink noise rise while serving greater numbers of users. The basic principle with UL DPCCH gating is that the user equipment automatically stops the continuous DPCCH transmission if there is neither E-DCH nor HS-DPCCH transmission and applies a known DPCCH activity (DPCCH on/off) pattern. When an E-DCH or HS-DPCCH transmission takes place also the DPCCH is transmitted regardless of the activity pattern. Examples for DPCCH gating patterns are shown in FIGS. 3a and 3b, considering TTIs of 2 ms and 10 ms. FIGS. 3a and 3b illustrate two examples of gated DPCCH transmissions assuming 2 ms subframes and HARQ-process numbers as illustrated in 31. The example in FIG. 3 assumes a gated transmission with 3 slots on and 45 off while FIG. 3b assumes a gated transmission with 3 slots on but 27 slots off. An E-DCH VoIP activity example is shown in 32, DPCCH transmission during voice inactivity in 33 and DPCCH transmission during voice activity in 34 whereby subframes with transmission are illustrated by a marking whereas subframes without transmission are not marked.

SUMMARY

It has been observed to be a fundamental problem with the DPCCH gating approach as described, e.g., in the document 3GPP TR25.903, "Continuous Connectivity for Packet Data Users" that regular on/off-gating patterns create waveforms that can interfere with non-UMTS audio equipments. This becomes especially problematic when the UMTS transmitter device that is using the on/off-gating pattern is close to the non-UMTS audio receiver, which will then cause a disturbing signal in the non-UMTS audio receiver. More generally, such interference may occur whenever a transmission power changes regularly (even if the power is not completely switched off in the "off"-periods).

It is therefore the object of the present invention to provide a solution for modifying the transmission instants of data packets in such a way that interference with external (e.g. non-UMTS) devices is significantly reduced.

This is achieved by introducing a randomization mechanism into the mapping function of data packets onto the HARQ processes, which in turn are mapped onto predefined transmission occasions (sub-frames). This results in a non-periodic transmission pattern while maintaining user data transmission requirements (e.g. in case of voice data, to deliver one voice data packet every 20 ms) without causing noticeable interference in external audio devices.

It is thus the advantage of the present invention that interference between a UMTS transmitter device that is using an on/off-gating pattern and a closely located non-UMTS audio receiver unit can be avoided.

DESCRIPTION OF THE INVENTION

FIG. 1 illustrates a UMTS terrestrial radio access network (UTRAN) as defined in the third generation mobile communications standard 3GPP. The UTRAN 100 includes one or more radio network sub-systems (RNSs) including a Radio Network Controller (RNC) 121 and one or more Node Bs 122 (the Node B is similar to a radio base station). The Node B 122 is managed by the radio network controller 121 and receives information transmitted from the physical layer of the user equipments (UE) 123 (sometimes called a mobile terminal) through an uplink channel and transmits a data to the user equipment 123 through a downlink channel. The Node B acts as an access point of the UTRAN from the UE's point of view and manages, inter alia, scheduling and HARQ mechanisms. The RNC 121 allocates and manages radio resources of the UMTS and is connected to a suitable core network 124 depending on types of services provided to users. The RNC manages, inter alia, Outer Loop Power Control (OLPC), Radio Link Control (RLC), and Admission and Congestion Control (ACC). The RNC in charge of a direct management of the Node B is called a Control RNC (CRNC) managing common radio resources. On the other hand, the RNC that manages dedicated radio resources for a specific UE is called a Serving RNC (SRNC). The CRNC and the SRNC can be co-located in the same physical node. However, if the UE has been moved to an area of a new RNC that is different from SRNC, the CRNC and the SRNC may be located at physically different places. The UMTS includes interfaces that operate as a communication path between various network elements. For example, the interface 125 between a Node B and a RNC is called an Iub interface, and the interface between RNCs is called an Iur interface. The interface between the RNC and the core network 124 is called an Iu interface 126.

A fundamental problem with the DPCCH gating approach described in the document 3GPP TR25.903, "Continuous Connectivity for Packet Data Users" is the fact that with a regular on/off gating pattern a waveform is created that interferes with non-UMTS audio equipment. This becomes especially problematic when the UMTS transmitter using an on/off-gating pattern is close to this non-UMTS audio receiver, as is the case for users wearing hearing aides. Such users will experience a disturbing signal in the hearing aid apparatus that stems from the gated UMTS waveform. As the frequency of the disturbing signal is typically in the order of 10's or 100's of Hertz, the user will notice this interference. To generalize the problem, interference may occur whenever the transmit power changes regularly (even if the power is not completely switched off in the 'off' periods). Examples include data from a gated control channel as described above;
  data from a constant rate data source, such as a voice codec, mapped on only a subset of the available transmission time intervals thus causing a change of power from high data and control power to low control-only power (assuming the control channel is not gated);
  a combination of the cases above where high power levels are sent with a regular pattern and where the control channel is gated between those transmissions. When considering this example, a voice data packet is generated by the voice codec in intervals of 20 ms and forwarded to the transmitter of the mobile station. When using on/off gating during periods of no data transmission, this will create a signal that shows typical characteristics of a waveform with a frequency of 50 Hz, i.e. which is clearly in the range of frequencies that is noticeable for the human ear.

Figure 4:
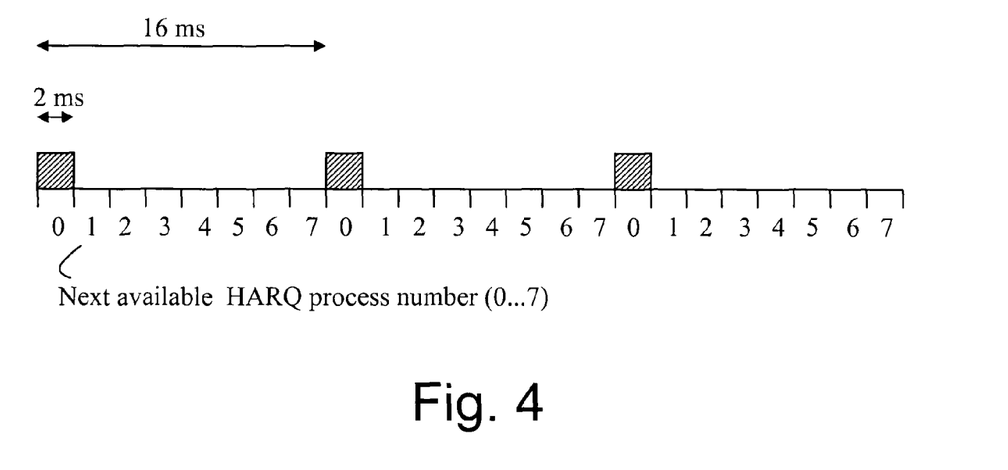
FIG. 4 shows an example of E-DCH transmission pattern without process randomization.
Figure 5:
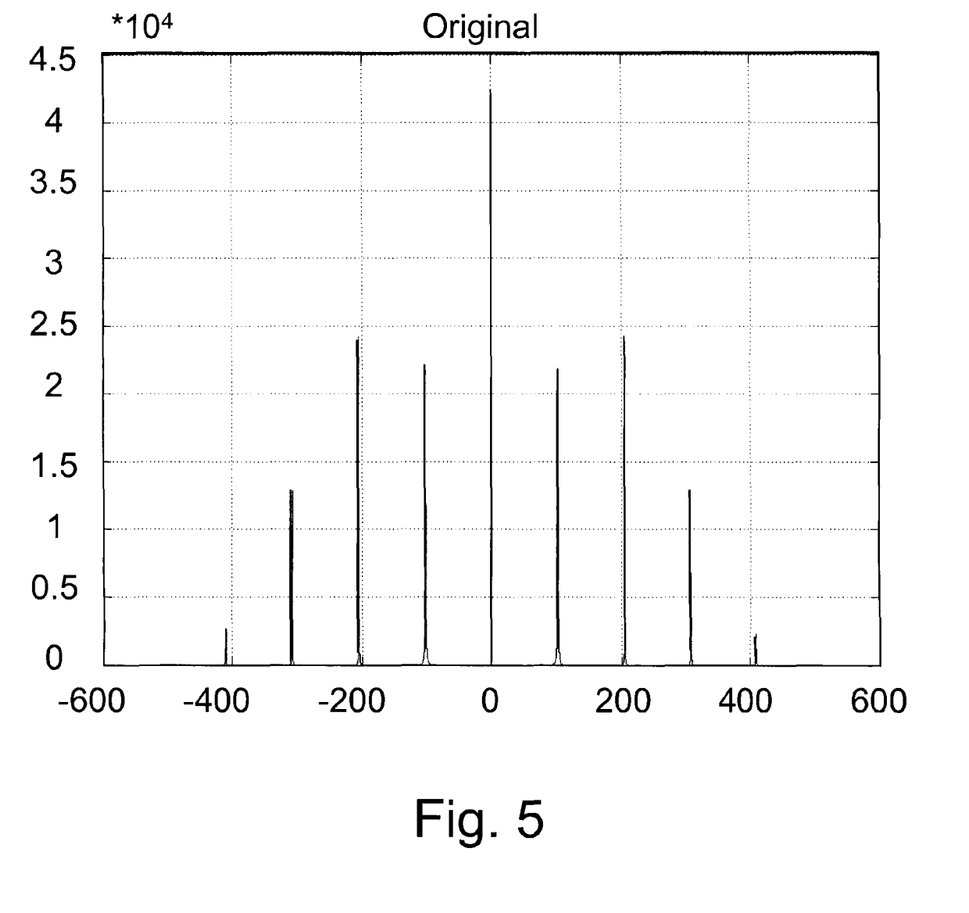
FIG. 5 shows the power spectrum of the example pattern in FIG. 4. The spectrum shows distinct power peaks at certain frequencies that are the cause of interference with external audio devices, such as hearing aides.

FIG. 5 shows the power spectrum for the example pattern in FIG. 4. The spectrum shows distinct power peaks at certain frequencies that are the cause of interference with external audio devices, such as hearing aides.

Figure 6:
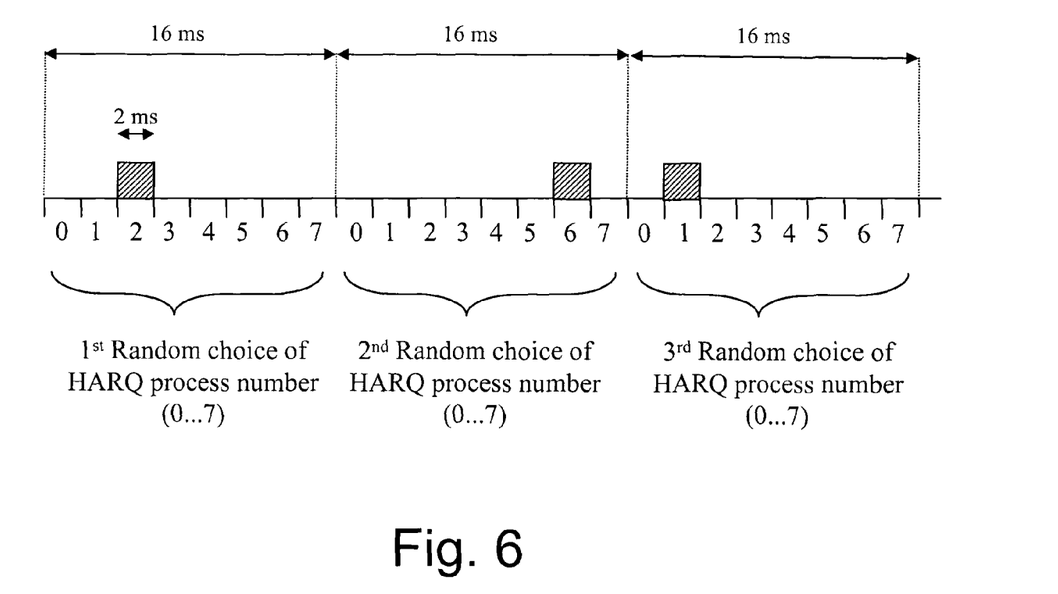
FIG. 6 shows an example of E-DCH transmission pattern with process randomization.

The basic concept of the present invention is to provide a break-up of the periodicity of the transmitted waveform while maintaining the requirements of transmission of data packets in terms of allowable delays and packet loss. This leads to a significant reduction in noticeable interference with external non-UMTS devices that are in the vicinity of a UMTS transmitting device, such as a hearing aid. The interference reduction is achieved by introducing a randomization mechanism into the mapping function of data packets onto HARQ processes, which in turn are mapped onto predefined transmission occasions (sub-frames). According to one embodiment of the present invention, which will be described in FIG. 6 below, is to use a pseudo-random pattern to select the HARQ process numbers out of the set of available HARQ process numbers within a given time frame, in which the data packets are transmitted. In the example of FIG. 6, the process numbers that are selected in this way are 2, 6, and 1.

Figure 7:
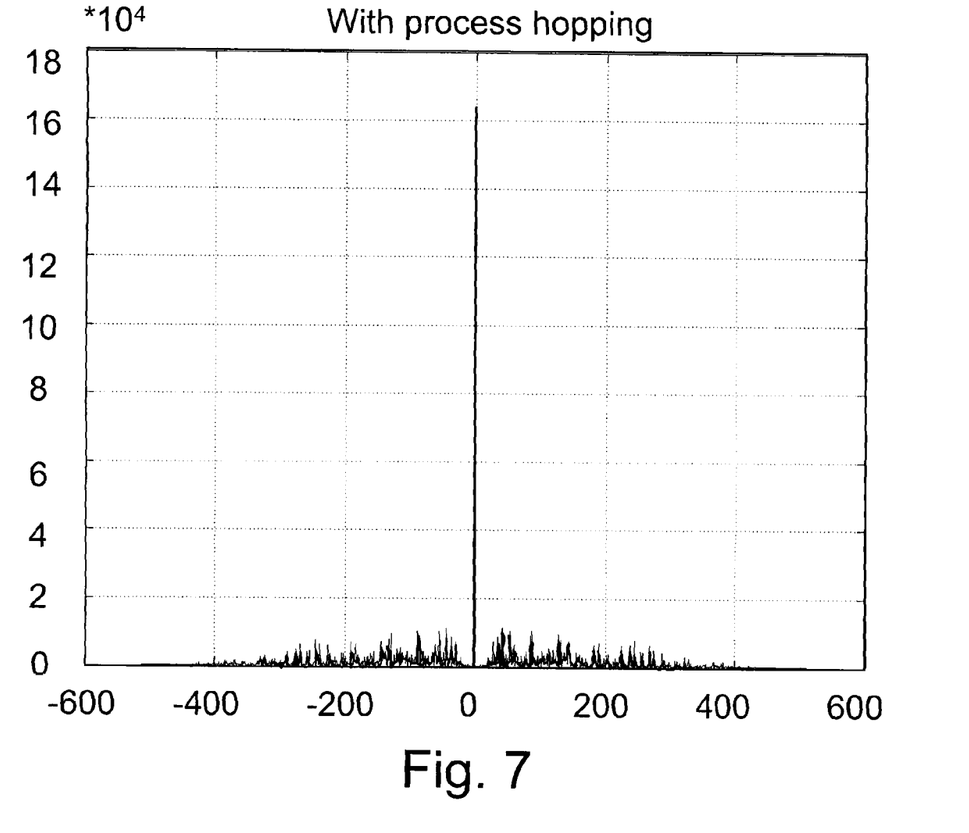
FIG. 7 shows the power spectrum for a signal with 2-ms pulses transmitted at some point during every period of 16 ms, with start positions restricted to n*2 ms where n is a (pseudo-)random number in the range 0 to 7.

FIG. 7 shows the power spectrum for a signal with 2 ms pulses transmitted at some point during every period of 16 ms, with start positions restricted to n*2 ms where n is a (pseudo-)random number in the range 0 to 7. Compared to the power spectrum of the non-randomized transmission of FIG. 5, a reduction in the power peaks in the order of a factor of 20 is noticeable, i.e. the interfering power level is reduced by around 13 dB.

The present invention comprises two main strategies of avoiding the periodicity of transmissions in order to eliminate most of the interfering peaks towards external audio devices. These main alternative solutions are further described hereafter. Also, a combination of the two proposed embodiments is possible. In addition, CQI transmission occasions are randomized as well. A preferred embodiment concerns 3GPP E-DCH transmission. E-DCH transmission can be performed by using two different TTI (2 ms and 10 ms). The following description and also the figures focus—without restriction of general principles to other TTI lengths—on the case of 2 ms TTI.

A first embodiment of the present invention relates to a pseudo-random HARQ process selection. The transmitter unit of the user equipment maps a data packet onto a HARQ process using either a systematic or pseudo-random mapping method and avoids thereby transmission occasions with a fixed periodicity. The method selects a pseudo-random HARQ process within a given time span by adding a pseudo-random offset to the next available HARQ process number and derives thus the eventual HARQ process number that is used for transmission. The principle of this operation is illustrated in FIG. 6.

Figure 9:
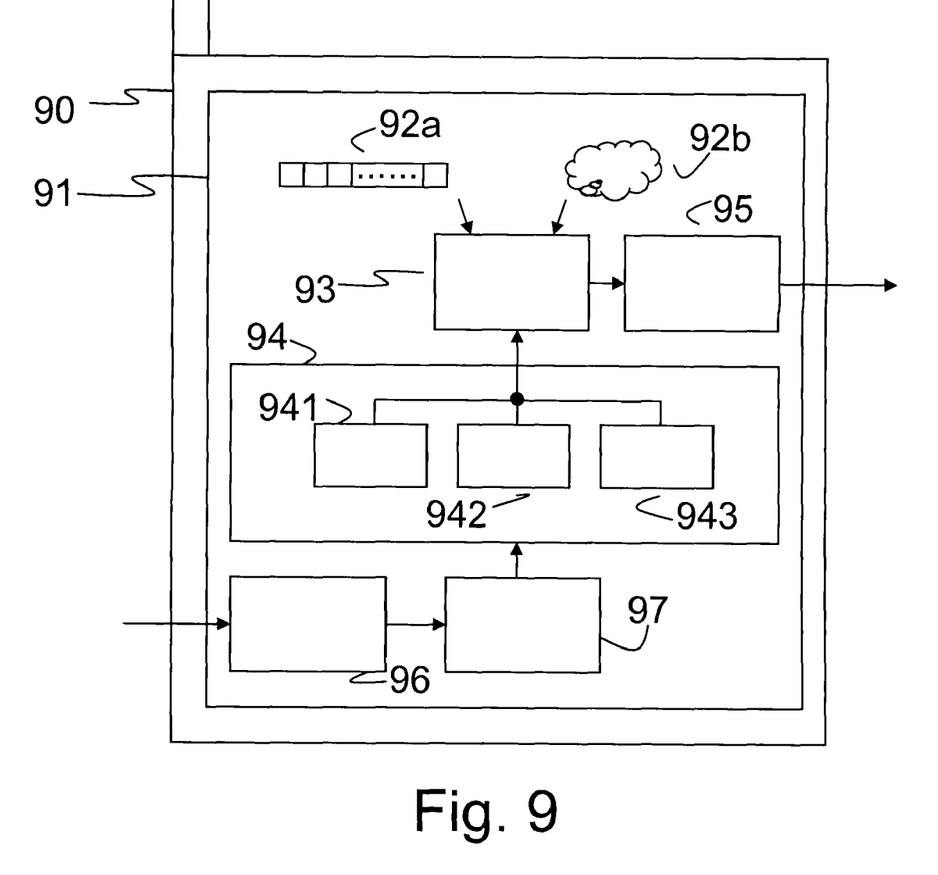
FIG. 9 illustrates a user equipment including a transmitter unit according to the present invention.
Figure 10:
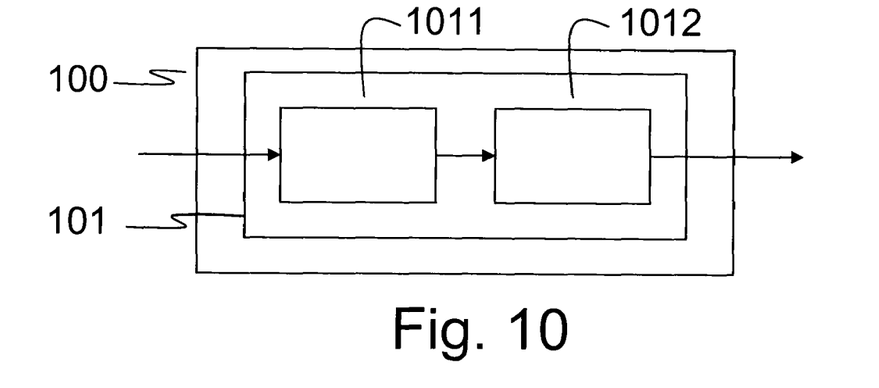
FIG. 10 illustrates a network controller node according to the present invention.

FIG. 9 illustrates a transmitter unit 91 in the user equipment 90 of a radio communication network whereby said transmitter unit 91 equipped for transmitting data packets 92a by a gated transmission scheme. Data packets 92a are mapped onto available HARQ-process numbers 92b by a mapping means 93, which is instructed by a randomizer 94 that randomizes the instances for transmitting said data packets 92a such as to avoid a fixed periodicity. A transmitting means 95 then transmits said data packets 92a at the time instance indicated by the mapped HARQ-process number. According to the first embodiment, the transmitter unit 91 includes a randomizer 94 with a randomized selection means 941 of HARQ-process numbers for transmitting of data packets to apply an either systematic or pseudo-random mapping such as to select a pseudo-random HARQ process within the randomization span by adding a pseudo-random offset to the next available HARQ process.

The operation of HARQ protocols also includes a retransmission mechanism of erroneously received data packets at a later transmission occasion of the same HARQ process that was selected for the initial transmission. In case of synchronous HARQ, there is no explicit scheduling of retransmissions. Thus, the transmission occasions of retransmissions within a given HARQ process have to be avoided by the pseudo-random selection process, which can be done by limiting the pseudo-random selection to only those HARQ processes that have no pending retransmissions. In order to limit the complexity in implementing a randomization process, a short pre-defined pseudo-random pattern can be used that is linked to a Connection Frame Number (CFN) in order to derive a HARQ process number. As an example, the offset to the HARQ process (0 . . . 7) number could be defined as the 3 least significant bits (LSB) of an N-times cyclic shift of a predefined binary sequence, e.g., s={0110100110100101101010001100110}, where N is equal to the Connection Frame Number (CFN). Other alternative methods can of course be used instead.

It may be desirable to avoid strict application of the pseudo-random offset in deriving the HARQ process number, e.g. to avoid out-of-order arrival of HARQ data packets. Therefore, a wrap-around mechanism can be used as is exemplified in FIG. 8. The following provides an example where it is assumed that the next available HARQ process for a data packet 2 has the process number 3 and that the randomly selected offset is the HARQ process number 6.

Figure 8:
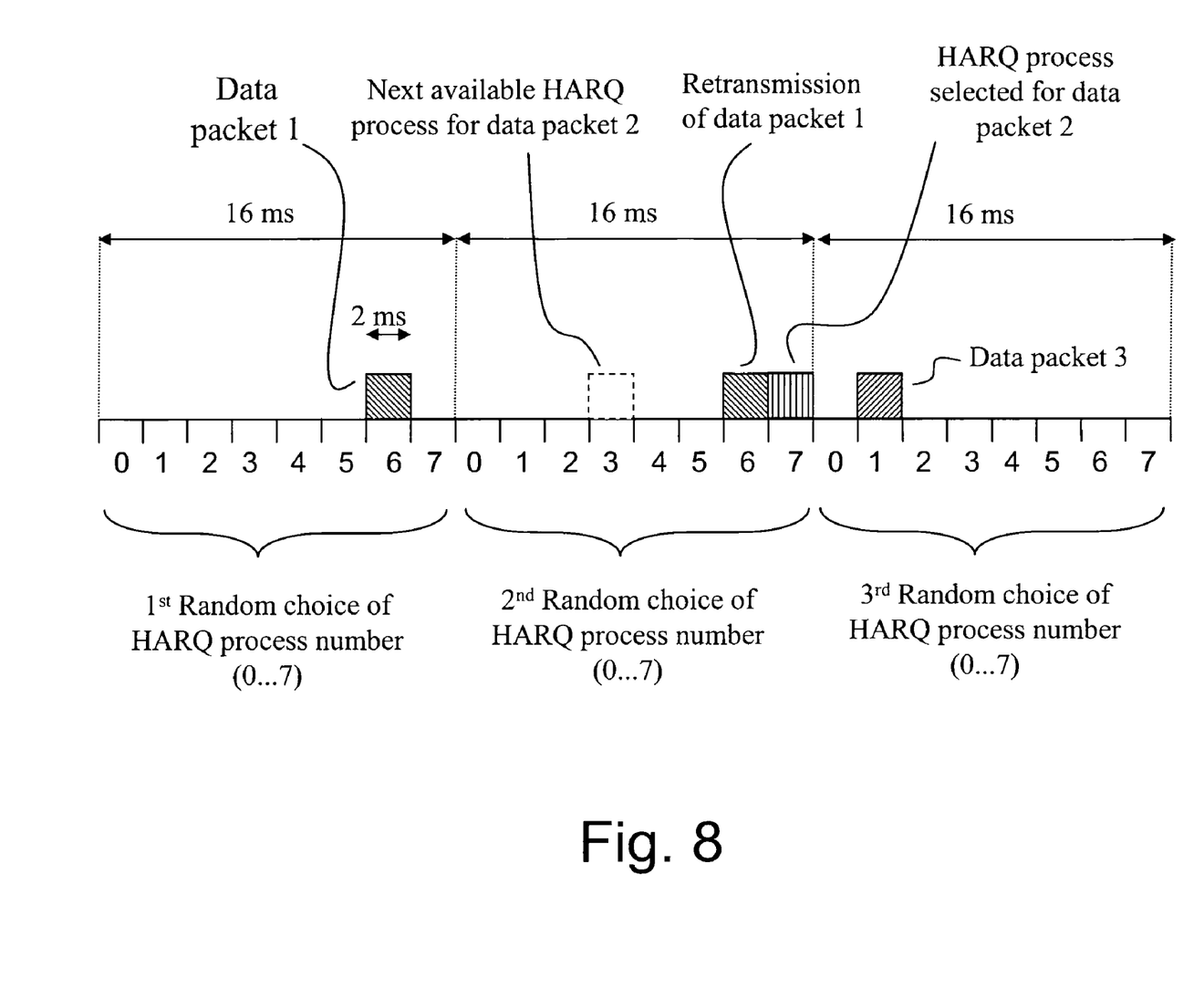
FIG. 8 shows an example of E-DCH transmission pattern with process randomization and wrap-around.

However, as the HARQ process number 6 is occupied with the retransmission of a data packet 1 from the previous 16 ms period, the randomly derived offset of 6 HARQ processes is applied using a wrap-around at the end of the 16 ms interval, thus avoiding the HARQ process number 6. As a result, the HARQ process that is finally selected for transmission of data packet number 2 is the HARQ process number 7.

One benefit of control channel gating is that the network can save resources by employing discontinuous reception. This requires a known UE transmission pattern, which is trivial in the prior art of periodic transmission, but also needs to be handled by the proposed solution. Hence, in order for the network to derive the selected HARQ process without the need for additional signaling, additional restrictions on the HARQ process selection in the UE can be preconfigured through higher layer signaling between the user equipment and the network. The time span (dynamics) of this offset can be configured by the network and signaled to the user equipment via higher layer signaling. This includes as a special case also the possibility to set the randomization span to zero and thus avoiding randomization completely, e.g. for cases of extremely delay-sensitive services.

A second embodiment of the present invention relates to a permutation of HARQ process transmission occasions. According to this alternative, the transmitter unit of the user equipment maps a data packet onto the next available HARQ process (without randomization in process number). A permutation method is used to randomize the transmission occasions of HARQ process numbers (while not randomizing the selection of the HARQ process), for example by pair-wise swap of two adjacent HARQ process transmission occasions within a larger time interval. This method may be beneficial in cases where stricter limitations to the selection of HARQ process are applicable that would prevent pseudo-random selection of HARQ processes, as for example for the case of multiplexing MAC flows with different priorities. A permutation rule can be preconfigured by higher layer signaling between the user equipment and the network. An example of a simple permutation rule is to shift the transmission occasion of each HARQ process by 2 ms after a given period of transmission, e.g. 80 ms. This would imply that the last HARQ process is shifted "out", which implies that any data waiting for transmission in this HARQ process would be discarded. This should have negligible impact on the overall system performance, as the HARQ protocol will in such a case simply order a further retransmission.

Referring again to the transmitter unit 91, the randomizer 94 achieves a randomization by permutation of the selection of HARQ-process numbers that data packets are mapped on, e.g. the permutation of the HARQ-process numbers introduced by pair-wise swap of two adjacent HARQ process transmission occasions within larger time intervals.

As of 3GPP Rel6 Standard (defined in 3GPP TS 25.214), a CQI is transmitted either in each HS-DPCCH subframe (i.e. every 2 ms) or with a defined periodic pattern resulting in transmission in every N:th subframe (the parameter N is configurable by higher layers from the RNC). In order to avoid periodicity in the CQI transmission pattern, an offset (in number of subframes) can be added to obtain a final CQI transmission occasion by using a pseudo-random process as described in section 4.1.1, where the random offset can be defined e.g. as the log2 (N) least significant bits of the cyclic shift. Further a wrap-around method can be applied to avoid that a delayed transmission of the CQI occurs within the next CQI transmission interval. This can be expressed, e.g., by the following formula:

$CQI\_subframe = original\_CQI\_subframe + (pseudo\_random\_offset \bmod N)$.

Finally, a randomization of UL DPCCH transmission is automatically obtained by following the principle of only transmitting UL DPCCH during slots where E-DCH transmission or CQI transmissions or ACK/NACK transmissions occur.

The invention claimed is:

1. A method in a transmitter unit of a user equipment, said transmitter unit equipped for transmitting data packets by a gated transmission scheme, the method comprising:
   mapping said data packets onto available Hybrid Automatic Repeat Request (HARQ)-process numbers and randomizing time instances for transmitting said data packets such as to avoid a fixed periodicity, where the randomizing is achieved by a randomized selection of the HARQ-process numbers for transmitting the data packets; and
   transmitting said data packets at the time instances indicated by the mapped HARQ-process numbers.

2. The method according to claim 1, where the randomized selection includes a systematic or a pseudo-random mapping and
   where a pseudo-random HARQ process is selected within a randomization span by adding a pseudo-random offset to a next available HARQ process.

3. The method according to claim 2, further comprising applying a wrap-around of the pseudo-random offset within a retransmission period of a HARQ-process to avoid collisions with retransmitted data packets of previous HARQ-processes.

4. The method according to claim 1, where the randomizing is achieved by permutation of the selection of HARQ-process numbers that data packets are mapped on.

5. The method according to claim 4, whereby the permutation of the selection of HARQ-process numbers is introduced by pair-wise swap of two adjacent HARQ process transmission occasions within larger time intervals.

6. The method according to claim 5, where the transmission occasions for transmission of Channel Quality Indications are randomized.

7. The method according to claim 1, wherein rules for the selection in the user equipment are preconfigured by a network controller node.

8. A transmitter unit in a user equipment, said transmitter unit equipped for transmitting data packets by a gated transmission scheme, the transmitter unit comprising:
   means for mapping said data packets onto available Hybrid Automatic Repeat Request (HARQ)-process numbers;
   a randomizer for randomizing time instances for transmitting said data packets such as to avoid a fixed periodicity, wherein the randomizer performs a randomized selection of the HARQ-process numbers for transmitting the data packets; and
   a transmitting means for transmitting said data packets at the time instances indicated by the mapped HARQ-process numbers.

9. The transmitter unit according to claim 8, where said randomizer is configured to apply a systematic or a pseudo-random mapping such as to select a pseudo-random HARQ process within a randomization span by adding a pseudo-random offset to a next available HARQ process.

10. The transmitter unit according to claim 8, where said randomizer includes a permutation means for selection of HARQ-process numbers that data packets are mapped on.

11. The transmitter unit according to claim 10, where said permutation means is configured to apply pair-wise swaps of two adjacent HARQ process transmission occasions within larger time intervals.

12. The transmitter unit according to claim 11, where said randomizer includes means for randomizing the transmission occasions for transmission of Channel Quality Indications.

13. The transmitter unit according to claim 8, further comprising an input means for receiving preconfigured rules for a selection in the user equipment and processing means to instruct the randomizer on the preconfigured rules.

* * * * *

UNITED STATES PATENT AND TRADEMARK OFFICE
CERTIFICATE OF CORRECTION

PATENT NO. : 8,155,065 B2  
APPLICATION NO. : 12/279149  
DATED : April 10, 2012  
INVENTOR(S) : Gerstenberger et al.

Page 1 of 1

It is certified that error appears in the above-identified patent and that said Letters Patent is hereby corrected as shown below:

On the Title Page, Item (75), under "Inventors", in Column 1, Line 1,
delete "Stockholm" and insert -- Kista --, therefor.

On the Title Page, Item (75), under "Inventors", in Column 1, Line 2,
delete "Hakan" and insert -- Håkan --, therefor.

On the Title Page, Item (73), under "Assignee", in Column 1, Line 2,
delete "(publ) (SE)" and insert -- (publ), Stockholm (SE) --, therefor.

On Title Page 2, Item (56), under "OTHER PUBLICATIONS", in Column 2,
Line 9, delete "Poject;" and insert -- Project; --, therefor.

In Column 1, Line 17, delete "Subscribers," and insert -- Subscribers' --, therefor.

In Column 8, Line 23, in Claim 10, delete "on," and insert -- on. --, therefor.

Signed and Sealed this  
Fifth Day of February, 2013

Teresa Stanek Rea  
*Acting Director of the United States Patent and Trademark Office*